United States Patent [19]
Frederickson et al.

[11] Patent Number: 5,740,218
[45] Date of Patent: Apr. 14, 1998

[54] SPACER FOR A TRANSPORTABLE NUCLEAR FUEL ROD BUNDLE

[75] Inventors: Christian D. Frederickson, Wilmington; Robert B. Elkins, Wilmington; Edward A. Croteau, Wilmington; Harold B. King, Wilmington; David G. Smith, Leland, all of N.C.

[73] Assignee: General Electric Company, Schenectady, N.Y.

[21] Appl. No.: 621,879

[22] Filed: Mar. 26, 1996

[51] Int. Cl.$^6$ .................................................. G21C 3/34
[52] U.S. Cl. ........................................................ 376/442
[58] Field of Search ............................ 376/438, 441, 376/442, 462

[56] References Cited

U.S. PATENT DOCUMENTS

| | | | |
|---|---|---|---|
| 4,780,273 | 10/1988 | Dressel | 376/441 |
| 5,089,221 | 2/1992 | Johansson et al. | 376/442 |
| 5,186,891 | 2/1993 | Johansson et al. | 376/438 |
| 5,444,748 | 8/1995 | Beuchel et al. | 376/442 |
| 5,566,217 | 10/1996 | Croteau et al. | 376/442 |

FOREIGN PATENT DOCUMENTS

| | | |
|---|---|---|
| 0518306 | 12/1992 | European Pat. Off. |
| 0545587 | 6/1993 | European Pat. Off. |

*Primary Examiner*—Daniel D. Wasil
*Attorney, Agent, or Firm*—Nixon & Vanderhye

[57] ABSTRACT

The spacer for a nuclear fuel bundle includes unit cells having upper and lower, generally octagonally shaped walls connected one to the other by spring leg portions along sides thereof 90° apart. The walls also carry stops in opposition to the sides of the walls to which the spring leg portions are connected. By orienting the cells in the spacer such that the majority of the cells have their stops lying toward one side of the spacer, the fuel bundle can be disposed in a horizontal position on the one side of the spacers. In that manner, the dead load of the fuel rods and spacers is borne by the stops along the underside of each spacer without substantially loading the springs of the spacer cells.

3 Claims, 3 Drawing Sheets

SPACER FOR A TRANSPORTABLE NUCLEAR FUEL ROD BUNDLE

TECHNICAL FIELD

The present invention relates to spacers for fuel rod bundles in nuclear reactors and particularly to spacers configured and oriented for supporting the fuel rods of the bundle in a generally horizontal configuration, for example, during manufacture and/or for shipment, and also for locating the fuel rods when the bundle is disposed in the nuclear reactor in a vertical orientation.

BACKGROUND

Generally, in a nuclear fuel bundle, there are provided a plurality of elongated nuclear fuel rods supported between upper and lower tie plates and within channels whereby coolant/moderator flows upwardly between the fuel rods for conversion to steam. Typically, the fuel rods are located relative to one another by a plurality of spacers spaced one from the other along the length of the fuel bundle. The spacers maintain the fuel rods spaced one from the other throughout their length, and which length can be on the order of approximately 160 inches. It will be appreciated that the fuel rods have an outer diameter of about 0.5 inches and typically are arranged in an array thereof within a bundle, for example, a 10×10 array. Additionally, water rods are also provided within the bundle and, for example, in a 10×10 array, may occupy 8 of the lattice or cell positions which could otherwise have been occupied by the fuel rods. Consequently, a 10×10 fuel bundle array may comprise 92 fuel rods and a pair of water rods.

Spacers are typically formed in a rectilinear grid defining cells, each cell confining and restraining a discrete fuel rod. There are many different types of spacers, for example, eggcrate spacers, as well as spacers formed of individual ferrules, such as described and illustrated in U.S. Pat. Nos. 5,186,891 and 5,089,221, of common assignee herewith, the disclosures of which are incorporated herein by reference. Most such spacers use one or more springs to bias the fuel rod confined in each cell against a pair of stops along opposite sides of the cell, thus maintaining the fuel rod in a predetermined position within the bundles relative to the other fuel rods of the bundle. For example, in the spacers illustrated in those U.S. patents, each cell is comprised of upper and lower arms interconnected one with the other by a pair of springs. The cells generally have an octagonal configuration, with the springs disposed between the upper and lower arms lying along right angularly related sides of the cell, while stops are provided along the opposing right angularly related sides of the upper and lower arms in opposition to respective springs. Each cell is welded to an adjacent cell and an encircling band of the spacer maintains the array of cells in the rectilinear grid.

Spacers of the type described in U.S. Pat. Nos. 5,186,891 and 5,089,221 are eminently satisfactory for use in a boiling water reactor. However, nuclear fuel bundles are typically manufactured off-site and transported from a nuclear manufacturing and assembly facility to a nuclear reactor site. In the course of the manufacture and transportation, the fuel bundles are arranged in a generally horizontal configuration with the fuel rods lying generally horizontal with the spacers supported along one of their sides. In prior spacers, including those of the aforementioned patents, the orientation of the springs and stops in the cells is such that a substantial majority of the fuel rods will rest in the manufacture, assembly and transport positions of the bundle on one or both of the springs. If the rods sit on the springs, the springs will take a permanent deformation or set due to their weight and particularly when acceleration forces are encountered during transport. The springs have substantially greater flexibility than the stops. For example, the springs are designed to apply 2.5 pounds of load on the rod during use when the fuel bundle is disposed in a vertical orientation. However, during shipping, with the fuel bundle in a horizontal orientation, a local greater than the design load is frequently exerted on the spring and the spring deforms. Also, acceleration forces during transshipment bring greater or lesser forces to act on the spacers. For example, if a 3 g acceleration in a downward direction occurs, there is cumulatively a 4 g acceleration downwardly, including the dead weight of the rod. Moreover, the load of the fuel rods during assembly and transshipment accumulates from the top side of the spacer to its bottom side. Also, it will be appreciated that in a 10×10 array of fuel rods, the weight of all 92 rods is carried by the undersides of the cells of the bottom side row of the spacer. Consequently, with the spring orientations as set forth in prior U.S. Pat. Nos. 5,186,891 and 5,089,221, the load on the springs becomes sufficiently great as to induce a permanent set to the springs, rendering the springs incapable of applying the designed 2.5 pound load on each rod during use in the nuclear reactor.

To maintain the fuel rods during shipment in a predetermined configuration without loading or substantially loading the springs, plastic spacers or fingers have been used for insertion between the fuel rods. Thus, groups of plastic fingers have been inserted between the rods from each of the four sides of the bundles to maintain the rods in predetermined positions and to minimize or eliminate the loading on the spacers during transshipment. Spacers of this type, however, create an additional set of problems. For example, not only must the spacers be inserted in and among the fuel rods, but they must be removed from the fuel rods at the fueling site. This is a laborious task and oftentimes the spacers must be removed using a hammer-like tool. The danger of damage to the fuel rods increases substantially. The fuel bundle must also be inspected after the removal of the plastic fingers to ensure that none remain and that the fuel rods have not been damaged. It will be appreciated that if a plastic finger is left in the fuel bundle and the bundle is inserted into the nuclear core, it could deleteriously affect the nuclear performance of the bundle. It also creates an additional problem of nuclear waste.

DISCLOSURE OF THE INVENTION

In accordance with the present invention, there is provided spacers for a nuclear fuel bundle which are constructed for supporting the nuclear fuel rods in both the horizontal shipping orientation of the nuclear fuel bundle for assembly and shipping and its vertical orientation during use. To accomplish this, the spacer is in the form of a rectilinear grid with discrete cells, each cell having a pair of stops and at least one spring preferably two, in general opposition to the stops for bearing against the fuel rod and biasing the fuel rod into engagement with the stops. In accordance with this invention, the stops are oriented in the array of cells of the spacer such that all of the stops are disposed in a like orientation, with a few minor exceptions. Thus, the stops may be arranged to one common side of the centerlines of the cells. In this configuration, when the bundle is oriented horizontally, the stops will underlie the fuel rods in supportive positions, while the spring or springs overlie the fuel rods. The weight of the fuel rods is transmitted through the grid-like structure onto the stops. The stops are able to carry the loading applied by the fuel rods to the stops and particularly the cumulative loading of the rods. The weight of the fuel in the horizontal orientation of the fuel bundle rods is essentially removed from the springs. Even during upward acceleration loads during shipment, the loading on the springs is temporary and the weight of the fuel rods is subtractive from those upward acceleration forces.

As a specific example, in a 10×10 array of fuel rods with two water rods occupying eight central lattice positions within the fuel bundle, the fuel bundle has 92 cells. With the exception of three and possibly five of the cells, the remaining cells, in excess of 35% of the number of cells in the array are oriented such that the pair of stops lies between the fuel rod in each cell and the side of the spacer bearing the entire load.

In a preferred embodiment according to the present invention, there is provided a spacer for a nuclear fuel rod bundle comprising a generally rectilinear grid having opposed sides and defining a plurality of cells for receiving fuel rods extending in generally parallel relation to one another, each cell including a wall for encompassing a fuel rod, the wall having at least one stop and at least one spring generally in opposition to the stop for biasing the fuel rod into engagement with the stop, the cells being arranged in the spacer with a number of the cells in excess of 35% of the plurality of cells within the spacer having both stops oriented in a common direction toward one side of the grid.

In a further preferred embodiment according to the present invention, there is provided a fuel bundle for a nuclear reactor comprising a plurality of fuel rods, a plurality of spacers at longitudinally spaced positions along the bundle for supporting the fuel rods when the bundle is positioned in a generally horizontal orientation with the fuel rods extending generally horizontally, each spacer including a generally rectilinear grid having opposed sides and defining a plurality of cells for receiving fuel rods extending in generally parallel relation to one another, each cell including a wall encompassing a fuel rod, the wall having a pair of stops spaced one from another along one side of the cell and at least one spring along an opposite side of the cell generally in opposition to the stops for biasing the fuel rod into engagement with the stops, the cells being arranged in the spacer with a number of the cells in excess of 35% of the cells within the spacer having both stops oriented toward one side of the generally rectilinear spacer.

In a still further preferred embodiment according to the present invention, there is provided a method of supporting a fuel bundle having generally parallel nuclear fuel rods and spacers located at axially spaced positions along the bundle, the spacers each including a rectilinear grid having opposed sides and defining a plurality of cells for receiving the fuel rods, comprising the step of providing a number of cells in excess of 35% of the cells within each spacer with a pair of stops for underlying and supporting the fuel rods in the bundle when the bundle lies in a generally horizontal position with the spacers on one side.

Accordingly, it is a primary object of the present invention to provide a novel and improved spacer for a nuclear fuel bundle having cells for the fuel rods oriented to support the fuel rods in a generally horizontal configuration for manufacture and shipment without deformation of the spacer springs and for locating the fuel rods when the bundle is disposed in the reactor in a vertical orientation and methods of supporting the fuel rods within the bundle for manufacture and/or shipment.

DESCRIPTION OF THE PREFERRED EMBODIMENTS

Figure 1:
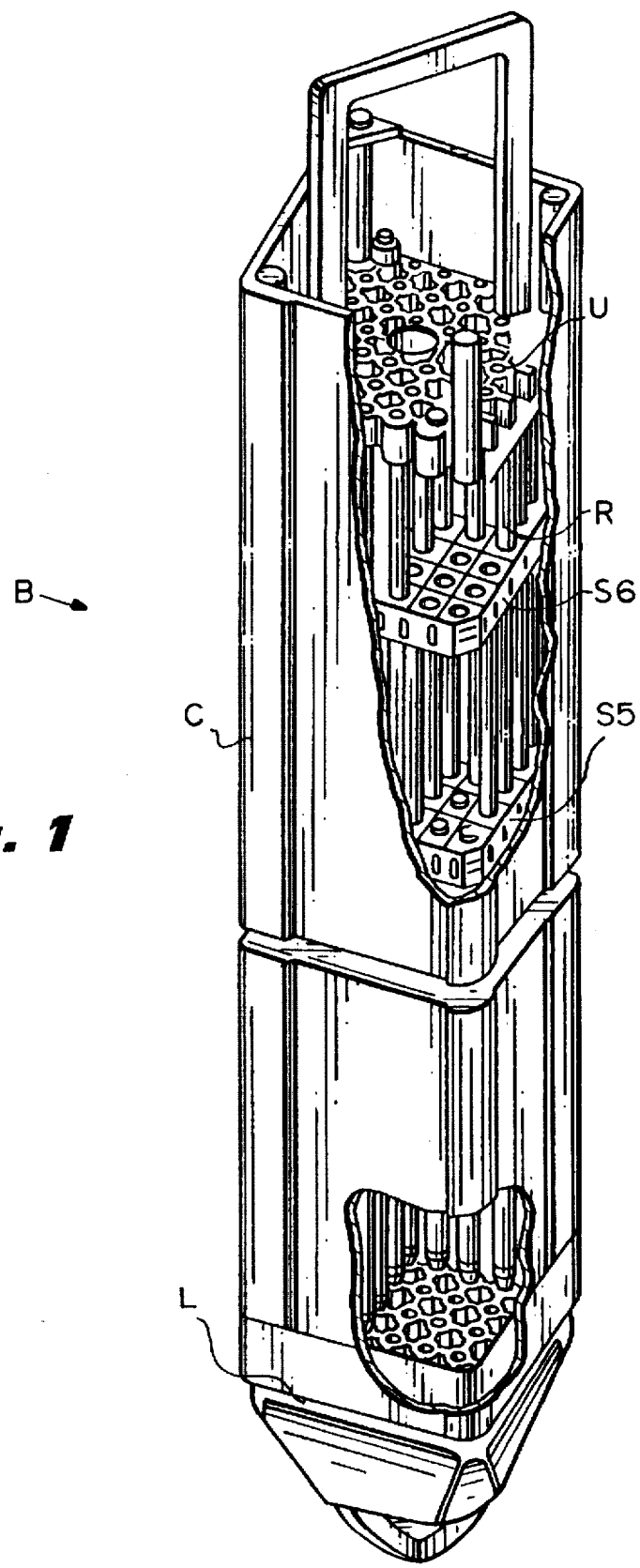
FIG. 1 is a perspective view of a typical nuclear fuel bundle assembly with the side of the channel surrounding the fuel bundle cut away so that the locations of the improved spacers of this invention are identified.

Referring to FIG. 1, a fuel bundle B is illustrated having its surrounding channel C broken away so that the interior construction can be understood. A lower tie plate L and an upper tie plate U are provided with a matrix of vertically upstanding fuel rods R disposed therebetween. The spacers are provided in the fuel bundle at spaced elevations relative to one another, spacers designated S5, S6 being illustrated. Typically, six or seven spacers are utilized along the length of the entire fuel bundle.

The spacers maintain the fuel rods in their designed side-by-side relation. This is accomplished by springs provided each cell of the spacer as described below. It will be appreciated that in the manufacture and assembly of the fuel bundle, the fuel bundle is laid on its side without its surrounding outstanding channel. Thus, the spacers lie on one of their side edges while the fuel rods are inserted through the spacers to form the fuel bundle. Additionally, during transportation, the fuel bundle, because of its length is transported on its side. At the fueling site, the fuel bundle is reoriented into a vertical position and disposed in the nuclear reactor. In that vertical position the springs of the unit cells bear against the individual fuel rods biasing them against stops of the cells in opposition to the springs whereby the fuel rods are maintained in appropriately designed laterally spaced positions relative to one another.

Figure 3:
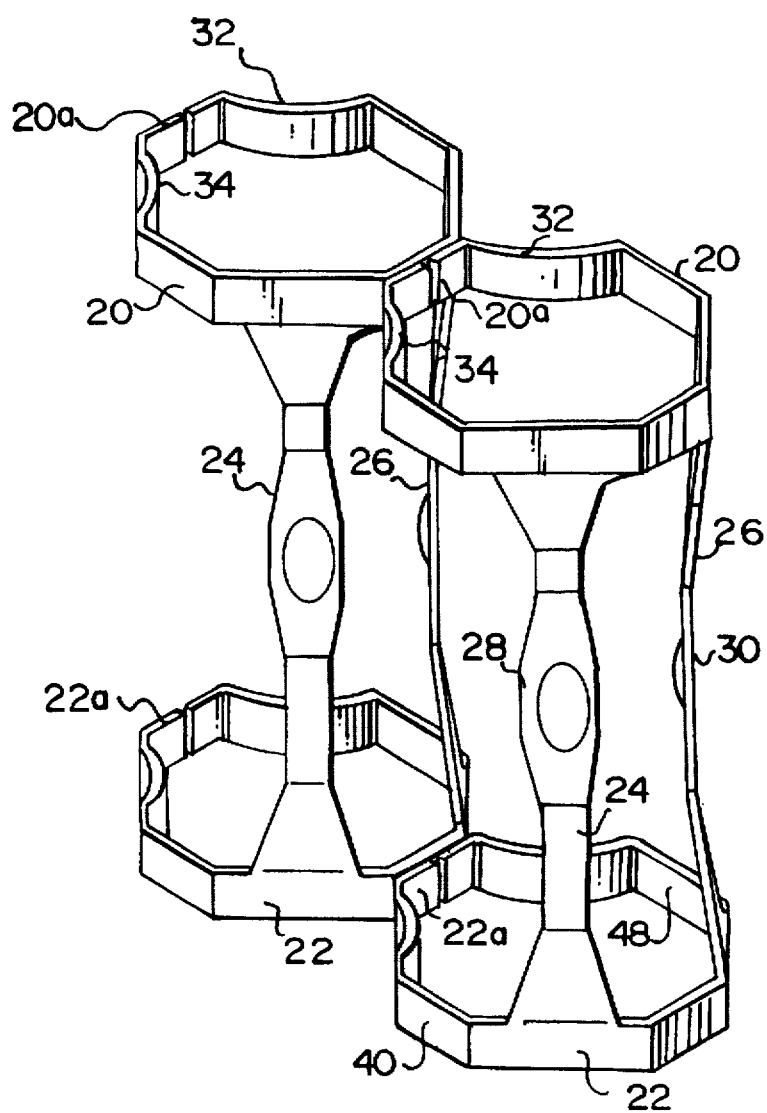
FIG. 3 is an enlarged perspective view of a pair of spacer cells.

The unit cells, as utilized in the present invention and a pair of which are illustrated in FIG. 3, each have upper and lower encircling arms or walls 20 and 22, respectively. The walls 20 and 22 are identical and are generally octagonal in shape. The upper and lower walls 20 and 22 are interconnected by spring legs 24 and 26. The spring legs 24 and 26 are spaced apart one from the other by one side of the generally octagonally shaped walls. Spring legs 24 and 26 are also deflected inwardly to define a central portion 28 and 30 for bearing engagement against a fuel rod extending through the cell. In each wall 20 and 22 and along a side thereof opposite the side to which the spring legs are coupled, there are provided stops 32 and 34. Particularly, the stops 32 and 34 are deflected or bent inwardly to form generally convex surfaces for engaging the sides of the fuel rod opposite the spring legs 24 and 26, respectively. As a consequence of this construction, it will be seen that the walls 20 and 22 are interconnected only by the pair of spring portions 24 and 26. Note also that each of the walls 20 and 22 terminate in ends 20a and 22a juxtaposed relative to one another along an octagonal side thereof opposite the side located between the sides mounting the spring legs 24 and 26.

Figure 2:
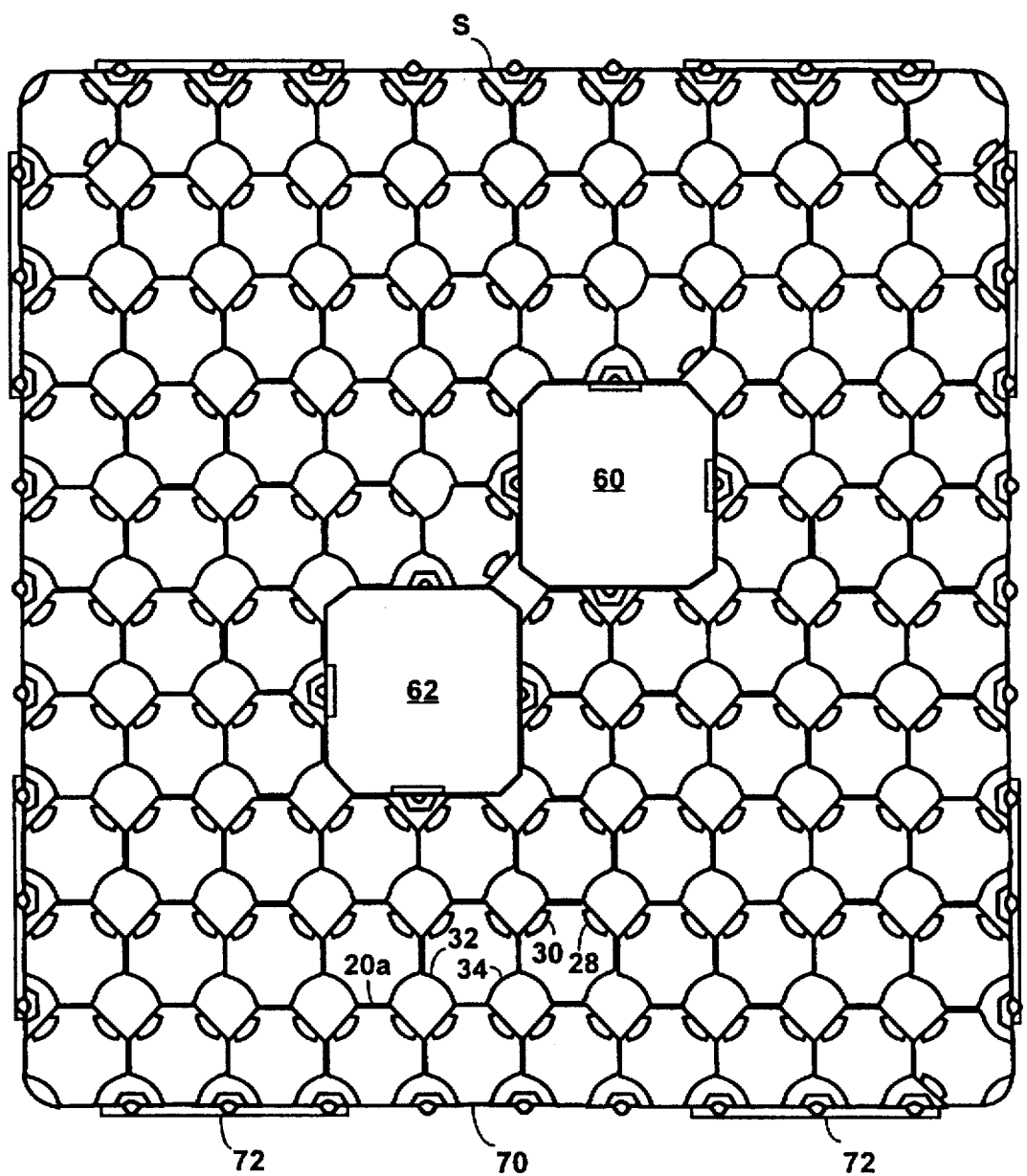
FIG. 2 is a plan view of a spacer illustrating the orientation of the cells within the spacer.

Each cell is connected to an adjoining cell by interconnecting the upper arms and lower arms, respectively, of the adjoining cells to one another. Additionally, as it will become apparent, the cells are joined one to the other in a particular orientation. For example, as illustrated in FIG. 2, the sides of one cell containing the ends 20a and 22a of the walls 20 and 22 are welded to the sides of an adjoining cell lying at a location next between the sides mounting the spring legs 24 and 26 of the next adjoining cell. Laterally adjoining cells are coupled to the walls 20 and 22 in a similar orientation. That is, the sides 40 of each cell are connected to the sides 48 of the adjacent cell. This pattern is repeated throughout the formation of the spacer with the exceptions noted below.

Referring now to FIG. 3, the spacer S is formed of a multiplicity of the unit cells joined one to the other in the manner illustrated in FIG. 2. For example, in FIG. 2 there is illustrated a fuel bundle having a 10×10 array of fuel rods extending through a corresponding array of unit cells forming the spacer. In the fuel bundle and, hence, the spacer of FIG. 2, two central openings 60 and 62 are provided through which water rods, not shown, extend for well known purposes in the fuel bundles of the nuclear reactor. In this particular 10×10 array, the water rods occupy a total of eight cell positions in the matrix and, hence, only 92 cells remain in each of the spacers. In accordance with the present invention and assuming the fuel bundle will be laid in a horizontal orientation with the spacers on one side, i.e., a lower side indicated at 70, it will be seen that the majority of the unit cells are oriented in the spacer with the stops along the underside or bottom side of the unit cells in that orientation. Thus, it will be appreciated that the weight of the fuel rods is born directly on the stops and not on the springs. Moreover, the cumulative weight of the fuel rods is transferred through the grid structure in a downward direction toward side 70 and ultimately the weight of the fuel rods and spacers are carried by the bottom row of unit cells. However, even the entirety of the bottom row does not carry the cumulative weight of the spacer and fuel rods because the spacer band surrounding the spacer has laterally projecting ribs 72 which extend outwardly along the sides a distance approximately three cell widths adjacent each end of the spacer side. Because of the nature of the construction of the unit cells and the welding of the cells one to the other, the stops along the bottom side have the capability of carrying the dead load of the fuel rods and spacers. Additionally, those stops have the capability of carrying live loads, for example, vertical accelerations during shipment. It will be appreciated that the springs of the unit cells thus lie above the fuel rods and are not subjected in the grid to the loading of the fuel rods either individually or cumulatively. Thus, the springs retain their spring characteristics and are not permanently set or deformed as a result of any necessity to bear the side loading of the fuel rods and spacers when the fuel bundle is in a horizontal orientation.

Not all of the cells, however, are oriented in a position with the stops along a common side of the spacer. By employing X-Y coordinates with a starting point at the corner cell in the upper left corner of the spacer, it will be seen that the corner spacers at X-Y positions 1,1; 10, 1; and 10,10 are oriented differently and have at least one spring lying along the underside of the cell in that orientation. Additionally, the unit cells at the 7,3 and 5,5 positions have unit cells which are rotated clockwise 90° from the orientation of the remaining cells of the spacer. The reorientation of the cells at these latter two positions is caused by an inability to have sufficient material for welding the ends of the walls of those spacers to the walls defining the water rod volume. Consequently, it is necessary to orient these cells differently and in the illustrated position. Consequently, it will be appreciated that the vast majority of the cells are oriented in the spacer with the stops located toward one side of the spacer so that when the spacer is placed on its side, the stops may comprise the underside of each unit cell for load carrying purposes with the exceptions noted above. Thus, the illustrated 10×10 array has 92 cells, five of which cells are oriented differently than the remaining 87 cells. In the known prior art, less than 35% of the cells in prior art spacers were oriented similarly to one another and with the pair of stops directed toward a common side of the spacer. In the preferred and illustrated embodiment, over 90% of the cells are oriented alike as illustrated in FIG. 3 and it is believed that cells in excess of 35% of the cells should be oriented in a like direction to accomplish the objectives of the present invention.

Also, in comparing the unit cells of the present invention with those of the prior art, e.g., those illustrated in U.S. Pat. No. 5,186,891, the depth of the walls 20 and 22 have been increased in comparison with the depth of the walls in the prior cells. Whereas previously a 0.09" deep wall was used, the walls of the present invention are 0.125" deep. This added material provides additional strength to enhance the ability of the spacer to lie in a horizontal orientation without separating fingers between the fuel rods and without providing a set to the springs.

Additionally, the cell to cell spacings of the present invention have been decreased. Specifically, the cell to cell spacing in the prior spacers was 0.510" which is now decreased to 0.509". The outside dimensions of the spacer, however, have not been changed and the decreased space from the outside fuel rods to the outside fuel rods on the opposite side has been added in the thickness of the ribs or bands surrounding the spacer. This increased thickness improve the nuclear performance of the fuel bundle by increasing the flow area. Further, the corners of the band are rounded. This further enhances the nuclear performance of the corner rods.

As a consequence of the foregoing construction, the spacer of the present invention is stronger, has enhanced potential for assembly and shipment without use of separating fingers by virtue of the orientation of the cells and their improved strength characteristics and also has improved nuclear performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spacer for a nuclear fuel rod bundle comprising:

a generally rectilinear grid having opposed sides and defining a plurality of cells for receiving fuel rods extending in generally parallel relation to one another;

each cell being formed of a discrete ferrule including a wall for encompassing a fuel rod, said wall having a pair of stops spaced from one another along a side of said cell and at least one spring along an opposite side wall of said cell generally in opposition to said stops for biasing the fuel rod into engagement with said stops, the wall of each said cell including upper and lower fuel rod encompassing arms, said stops being spaced along said upper arm and a second pair of stops spaced along said lower arm at like sides of said cell as said pair of stops along said upper arm, said spring interconnecting said upper and lower arms and having a fuel rod contact point intermediate said upper and lower arms;

said cells being arranged in said spacer with a number of said cells in excess of 50% of said plurality of cells within the spacer having both said stops oriented in a common direction toward one side of said grid.

2. A spacer according to claim 1 including a second spring interconnecting said upper and lower arms, the first mentioned spring and said second spring being in opposition to respective stops of said first and second pairs thereof along said arms.

3. A spacer according to claim 1 wherein said cells have centerlines and are arranged in orthogonally related rows respectively parallel to adjoining sides of said rectilinear grid, said stops in each cell of said number thereof being located between said centerline and said one side of said grid.

* * * * *